(12) United States Patent
Chandrasekaran et al.

(10) Patent No.: US 8,966,254 B2
(45) Date of Patent: *Feb. 24, 2015

(54) KEYLESS CHALLENGE AND RESPONSE SYSTEM

(75) Inventors: Subramaniyam Chandrasekaran, Bangalore (IN); Shunmugam Murugan, Bangalore (IN); Arun C. Ramachandran, Bangalore (IN); Lakshmanan Velusamy, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 492 days.

This patent is subject to a terminal disclaimer.

(21) Appl. No.: 12/901,696

(22) Filed: Oct. 11, 2010

(65) Prior Publication Data

US 2012/0089837 A1   Apr. 12, 2012

(51) Int. Cl.
*H04L 9/32* (2006.01)
*G06F 21/00* (2013.01)
*G06F 7/04* (2006.01)
*H04L 9/00* (2006.01)
(Continued)

(52) U.S. Cl.
CPC ... *H04L 9/00* (2013.01); *H04L 9/32* (2013.01); *H04L 63/0869* (2013.01); *H04W 12/06* (2013.01); *G06F 21/6218* (2013.01); *H04L 63/08* (2013.01); *G06F 21/31* (2013.01)
USPC ............... 713/168; 713/169; 713/182; 726/4; 726/5

(58) Field of Classification Search
CPC ....... H04L 63/08; H04L 63/0869; H04L 9/32; G06F 21/31; G06F 21/6218; H04W 12/06
USPC ................... 713/165, 168, 169, 182; 726/4, 5
See application file for complete search history.

(56) References Cited

U.S. PATENT DOCUMENTS

| 6,535,980 B1 | 3/2003 | Kumar et al. |
| 7,194,765 B2 | 3/2007 | Blom |

(Continued)

FOREIGN PATENT DOCUMENTS

| EP | 0687087 B1 | 8/2000 |
| EP | 0977452 A3 | 12/2000 |

(Continued)

OTHER PUBLICATIONS

U.S. Appl. No. 13/417,040—Non-Final Office Action mailed Aug. 27, 2014.

*Primary Examiner* — Aravind Moorthy
(74) *Attorney, Agent, or Firm* — A. Bruce Clay

(57) ABSTRACT

A confidential information exchange between a sender and a receiver may be conducted without the use of encryption keys. The information is coded with a Challenge-Response Table that is shared between the sender and the receiver. Rather than sending a challenge and then waiting for a response, the challenge and response are both sent by the sender of the information. The information sent comprises an index with a challenge and a response from the Challenge-Response Table. Upon receiving the coded information, the receiver uses the Challenge-Response Table to decode the information by using the index to locate the challenge and its valid response. Upon determining that the challenge and the response are correct, a first decoded answer is determined. Upon determining that either the challenge or the response, or both, are incorrect, a second decoded answer is determined.

11 Claims, 3 Drawing Sheets

(51) Int. Cl.
  *H04L 29/06* (2006.01)
  *H04W 12/06* (2009.01)
  *G06F 21/62* (2013.01)
  *G06F 21/31* (2013.01)

(56) References Cited

U.S. PATENT DOCUMENTS

| | | |
|---|---|---|
| 2004/0249901 A1 | 12/2004 | Wallace |
| 2004/0255005 A1 | 12/2004 | Spooner |
| 2006/0212701 A1 | 9/2006 | Warwick |
| 2007/0179905 A1* | 8/2007 | Buch et al. ............ 705/75 |
| 2008/0104188 A1 | 5/2008 | Oliver et al. |
| 2009/0031405 A1 | 1/2009 | Tsutsumi et al. |
| 2009/0204801 A1* | 8/2009 | Smith et al. ............ 713/1 |
| 2009/0271860 A1 | 10/2009 | Nonaka et al. |
| 2010/0290617 A1* | 11/2010 | Nath ............ 380/29 |
| 2010/0293376 A1* | 11/2010 | Colon ............ 713/168 |
| 2011/0314529 A1* | 12/2011 | Bailey, Jr. ............ 726/7 |
| 2012/0173876 A1* | 7/2012 | Chandrasekaran et al. .. 713/168 |

FOREIGN PATENT DOCUMENTS

| | | |
|---|---|---|
| EP | 2045754 A1 | 4/2009 |
| WO | 2005122462 A1 | 12/2005 |

\* cited by examiner

KEYLESS CHALLENGE AND RESPONSE SYSTEM

BACKGROUND

The present invention generally relates to secure electronic data transfer and, more particularly, to a keyless challenge and response system.

Cryptography can be used to facilitate the transfer of confidential messages (such as a password or credit card number) between two parties over an insecure communication channel (such as the Internet) that would otherwise allow the messages to be intercepted and decoded. This generally involves providing the construction of an encryption scheme (at the sender's end) that uses some encryption keys to transform the messages into a coded or cipher text, and a decryption scheme (at the receiver's end) to recover the original message from the cipher text, again using some decryption keys. The decryption scheme uses the inverse of the encryption scheme, in order to recover the message correctly. By coding the message, a party eavesdropping on the unsecure channel will not be able to understand the message, even though he will be able to listen to it. All cryptosystems have three potential parties, a sender of the message, a receiver for whom it is intended, and an eavesdropper.

BRIEF SUMMARY

According to one embodiment of the present invention, a method for keyless decoding of information comprises receiving coded information at a receiver. The information comprises an index with a challenge and a response from a predefined challenge and response table that is stored in a computer memory. At the receiver, the microprocessor compares the challenge and the response at the index in the predefined challenge and response table. Upon determining the challenge and the response are correct, determining a first decoded answer. Upon determining that either the challenge or the response, or both, are incorrect, determining a second decoded answer.

According to one embodiment of the present invention, a computer system for keyless decoding of information comprises a processor programmed to receive the coded information at a receiver. The coded information comprises an index, a challenge, and a response from a predefined challenge and response table stored in a computer memory. The receiver compares the challenge and the response at the index to the predefined challenge and response table. Upon determining that the challenge and the response are correct, determine a first decoded answer. Upon determining that either the challenge or the response, or both, are incorrect, determine a second decoded answer.

According to one embodiment of the present invention, a computer program product decodes information without keys. The computer program product comprises a computer readable storage medium having computer readable program code embodied therewith. The computer readable program code comprises computer readable program code configured to receive the coded information at a receiver. The coded information comprises an index, a challenge, and a response from a stored predefined challenge and response table. The computer readable program code is configured to compare, at the receiver, the challenge and the response at the index to the predefined challenge and response table. The computer readable program code is configured to, upon determining that the challenge and the response are correct, determine a first decoded answer. The computer readable program code is configured to, upon determining that either the challenge or the response, or both, are incorrect, determine a second decoded answer.

DETAILED DESCRIPTION

Figure 1:
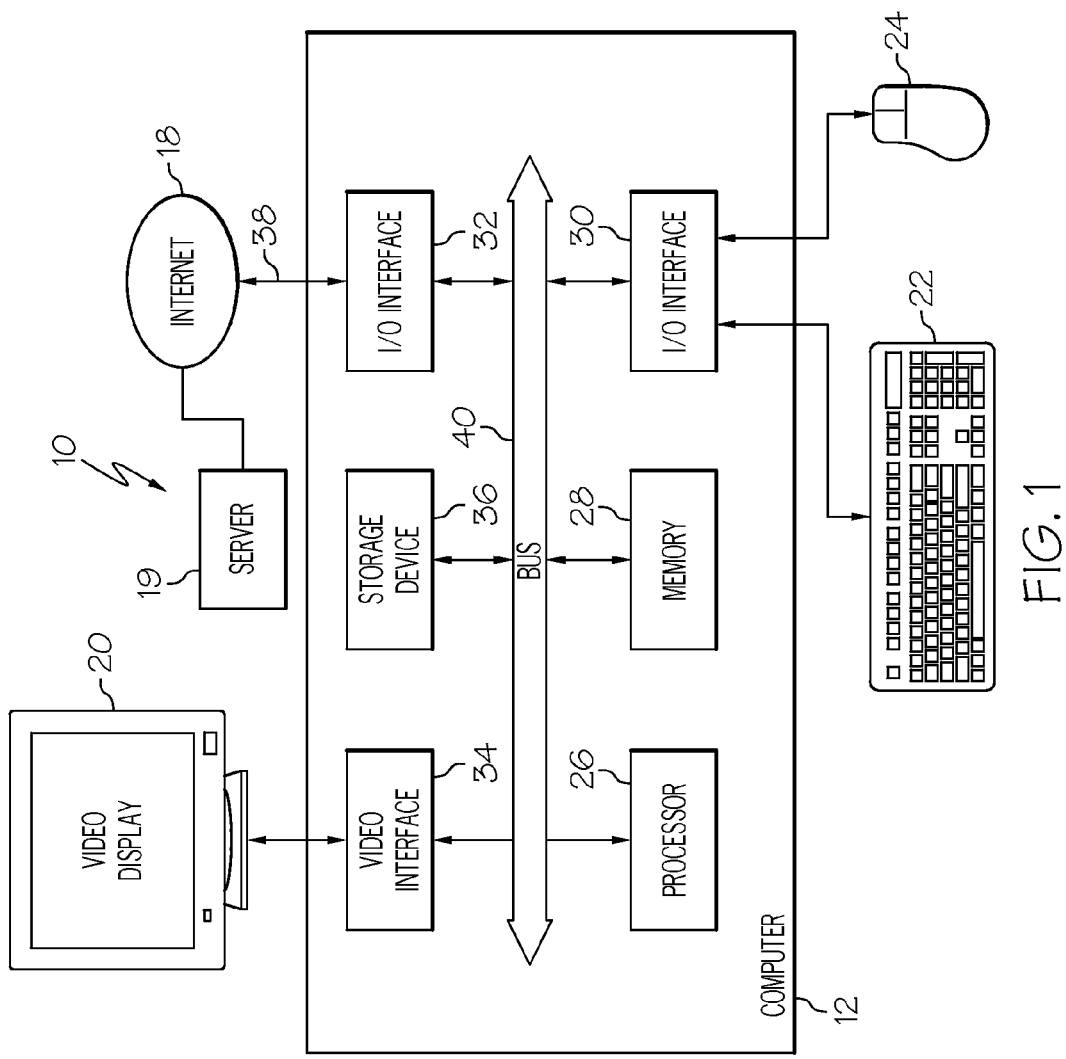
FIG. 1 is computer system which may be used with an embodiment of the invention.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof FIG. 1 is one example of a computer system 10 suitable for executing computer software for a keyless challenge response system. Other processing devices which are suitable for executing the software can be a wireless telephone, personal assistant device (PDA), portable computer, smart remote control device, or any other processing devices that can execute such software.

The computer system 10 is of a type that executes under a suitable operating system installed on the computer system 10. The components of the computer system 10 include a computer 12, a keyboard 22, mouse 24, and a video display 20. The computer 12 includes a processor 26, a memory 28, input/output (I/O) interfaces 30 and 32, a video interface 34, and a storage device 36.

The processor 26 is a central processing unit (CPU) that executes the operating system and the computer software executing under the operating system. The memory 28 includes random access memory (RAM) and read-only memory (ROM), and is used under direction of the processor 26.

The video interface 34 is connected to a video display 20 and provides video signals for display thereon. User input to operate the computer 12 is provided from the keyboard 22 and mouse 24. The storage device 36 can include a disk drive or any other suitable storage medium, as discussed above. Each of the components of the computer 12 is connected to an internal bus 40 that includes data, address, and control buses, to allow components of the computer 12 to communicate with each other via the bus 40. The computer system 10 can be connected to one or more other similar computers via an input/output (I/O) interface 32 using a communication channel 38 to a network, represented as the Internet 18. One or more servers 19 may be connected to the computer 12 via a network, such as, the Internet 18. The servers 19 may comprise the same physical arrangement as the computer 12 and may be co-located with or a part of the computer 12.

The computer software may be recorded on a computer readable storage medium, in which case, the computer software program is accessed by the computer system 10 from the storage device 36. Alternatively, the computer software can be accessed directly from the Internet 18 by the computer 12. In either case, a user can interact with the computer system 10 using the keyboard 22 and mouse 24 to operate the programmed computer software executing on the computer 12.

Figure 2:
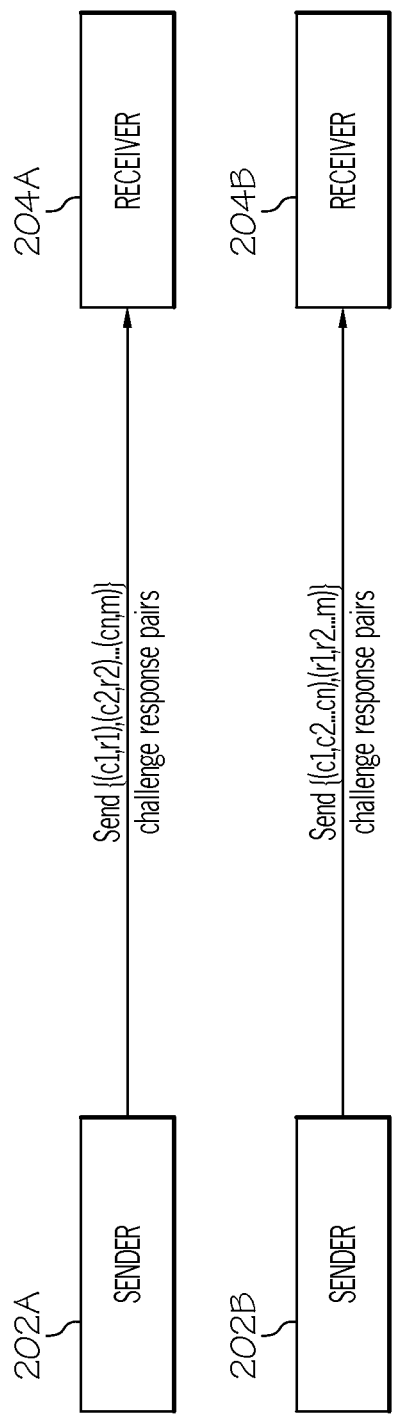
FIG. 2 is a block diagram of an embodiment of the present invention.

With reference now to FIG. 2, an embodiment of the present invention may transfer confidential messages over insecure or secure communication channels. A keyless encryption mechanism is used wherein a Challenge and a Response string is shared between sender and receiver. The Challenge and Response strings are indexed and arranged in a table, as will be subsequently described in greater detail, which is already in the possession of the sender and the receiver. The sender selects both the Challenge and Response for use in the transfer of information. First, the sender converts the confidential message into a binary format, such as, 1's and 0's, using techniques well known in the art. For example, if the sender wants to send the number 17, it is converted into binary form, i.e., 00010001. While the invention is described herein as using 1's and 0's, it is to be understood that any other characters, including alphabetic, may be used. In addition, while the present invention is described in relation to short information transfers, such as, for example, credit card and passport numbers, longer information transfers are contemplated herein.

If a sender wants to send 'n' number of bits to a receiver, he sends n Challenges and n Responses in a predetermined format. In one format, the sender 202A sends the Challenge (c) and Response (r) pairs as {(c1, r1), (c2, r2) . . . (cn, rn). The receiver 204A receives these Challenge-Response pairs and checks each Challenge and Response pair in the pre-agreed table and decodes as 1, if the Response is correct, or as 0, if the Response is not correct. The process can be reversed (decode as 0, if the Response is correct, decode as 1, if the Response is not correct), depending upon the choice of the implementer.

In another format, the sender 202B sends the C-R pairs as {(c1, c2, . . . cn), (r1, r2, . . . rn). The receiver 204B receives these Challenge-Response pairs and checks each Challenge and Response pair in the pre-agreed table, as described above.

In accordance with an embodiment of the invention, there is no need for synchronous transfers between the sender 202 and the receiver 204, as all Challenges and Responses are sent in one message. Thus, a separate Response from the receiver 202 to the sender 204 after each Challenge is not required.

In an embodiment of the present invention the sender 202 can send the Challenge and Response as follows: .
<Index, Challenge, Response>

'Index' is a number which indicates the slot ID in a shared Challenge-Response (C-R) table. 'Challenge' is the string present at the slot ID represented by the Index number. 'Response' is a substring of the string present at the slot ID represented by the Index number, if the transmitted bit (decoded value) is 1. If the decoded value is 0, the Response will be some random letter which is not a substring of the string present at the slot ID represented by the Index number. Once a correct Response is used, that Response substring is removed from the Response column of the C-R table by both the sender and the receiver. If the Response column becomes empty, it can only be used to provide a decoded 0. The use of an index improves the rate of coding and decoding by providing a pointer to the correct Challenge and Response in a C-R table.

TABLE 1

| Challenge character received (A) | Response character Received (B) | Decoded value of A and B |
|---|---|---|
| CORRECT | INCORRECT | 0 |
| CORRECT | CORRECT | 1 |
| INCORRECT | INCORRECT | 0 |
| INCORRECT | CORRECT | 0 |

Referring to Table 1, if the Challenge character received (A) is correct, and the Response character received (B) is incorrect, the decoded value for A and B is 0. If a Challenge character received (A) is correct, and the Response character received (B) is correct, the decoded value for A and B is 1. If a Challenge character received (A) is incorrect, and the Response character received (B) is incorrect, the decoded value for A and B is 0. If a Challenge character received (A) is incorrect, and the Response character received (B) is correct, the decoded value for A and B is 0.

The Table 1 values are used with the following example Challenge-Response Table 2 which is already available and stored in memory at the sender and the receiver:

TABLE 2

| | (C-R) | |
|---|---|---|
| Slot Number | CHALLENGE | RESPONSE |
| 1 | XYZ | BH |
| 2 | MNO | KLR |

The Challenge corresponding to slot 1 (Index 1) is the string XYZ and the correct Response is a substring (B or H) of the string BH. The Challenge corresponding to slot 2 (Index 2) is the string MNO and the correct Response is a substring (K, L, or R) of the string KLR. In one embodiment of the invention, to transmit a 1, send {slot Number, Challenge, Response substring} and to transmit a 0, send {slot number, Challenge, random string}. Thus, to send a 1, the sender could transmit: {1 (indicating slot number 1), XYZ (indicating the Challenge string for slot 1), and B (indicating a Response substring for slot 1)}. If the sender wants to send a 0, the sender could transmit: {2 (indicating slot number 2), MNO (indicating the Challenge string for slot 2), and B (indicating a random substring (i.e., not K, L, or R) for slot 2)}. Whenever a bit of 1 is decoded, that substring must be trimmed from the Response string in the table. However, the Challenge string can remain, if any unused Responses remain.

Figure 3:
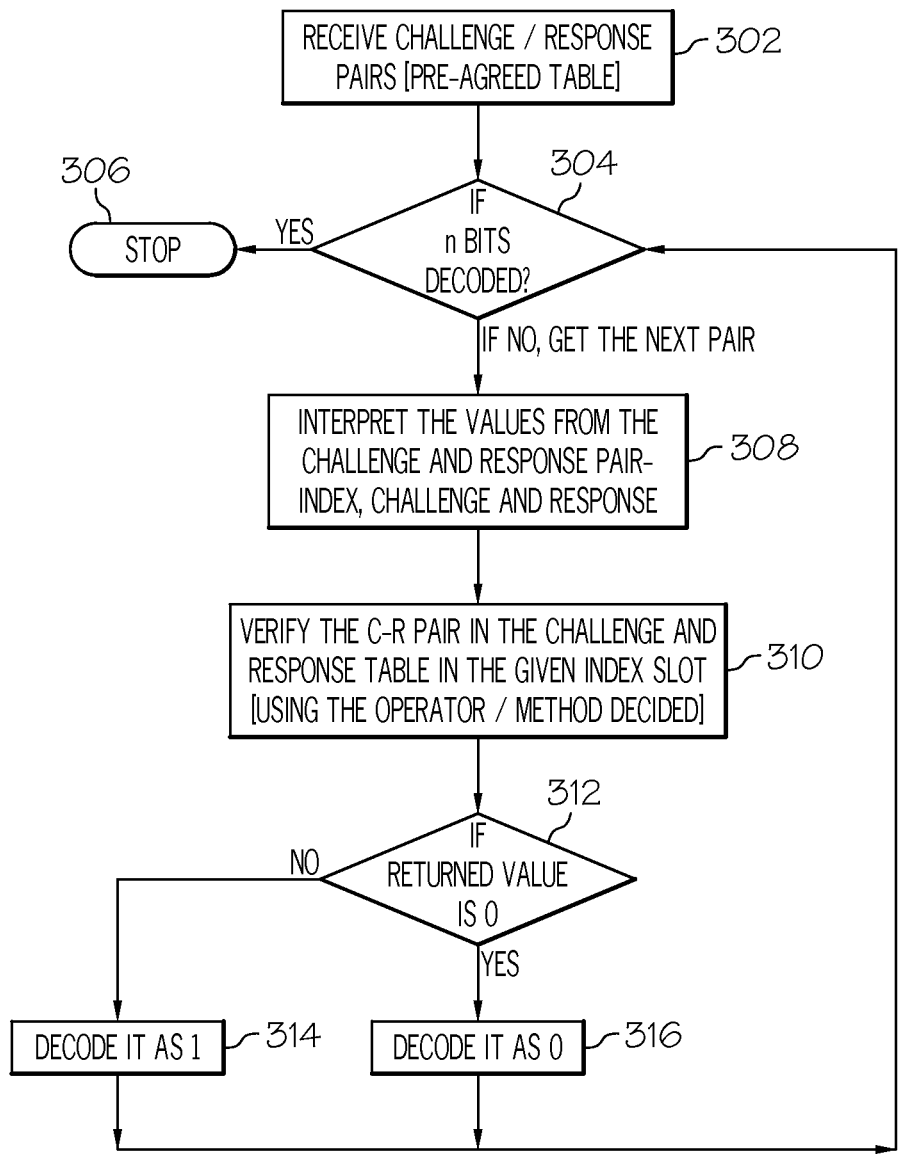
FIG. 3 is a high level flowchart of an embodiment of the present invention.

Referring to FIG. 3, an embodiment of the present invention is illustrated in a flow chart. At block 302, a C-R pair is received by the receiver in accordance with an agreed C-R Table. At decision block 304, it is determined whether n (all that were sent) have been decoded. If the response is yes, the process stops at 306.

If the response to decision block 304 is no, the next C-R pair is obtained, and the values from the Index, Challenge, and Response Table, stored in a memory at the receiver, are interpreted at block 308. At block 310, the C-R pair are verified in the C-R Table at the given index slot using the method, as agreed upon. In operation, the challenge and response sent are compared to the strings in the agreed upon C-R Table at the given index number.

It is determined at decision block 312 if the value of the C-R pair is 0. If the response is no, the C-R pair is decoded as 1 at block 314. If the response is yes, the C-R pair is decoded as 0 at block 316. Subsequent to block 314 or block 316, the process returns to decision block 304 and continues as described above until all received bits are decoded.

Example 1

A sender wants to transfer 101. The C-R Table 2 (above) has been shared between the Sender and the Receiver and is already stored in memory at the Sender and the Receiver computers.
1. First transfer (first bit): {1, XYZ, B} is transmitted. The Receiver decodes this as 1, since {XYZ} is the correct Challenge string and B is a correct substring of the Response string {BH} in the first slot. The Response string {BH} is then trimmed to {H}.

2. Second transfer (second bit): {1, XYZ, N} is transmitted. The Receiver decodes this as 0, since N is not a substring of the trimmed Response string {H}.
3. Third transfer (third bit): {1, XYZ, H} is transmitted. The Receiver decodes this as 1, since H is a substring of the trimmed Response string {H}. Therefore, the trimmed Response string for slot 1 is empty ({""}), as both substrings therein (H and B) have been used. Now that the Response string for slot 1 is empty, slot 1 cannot be used to send a 1, and the Challenges in slot 1 are also removed.

To make unwanted third party decoding even more difficult, the decoding can be used along with a Boolean operator, such as the ampersand (&). Any operator can be used as long as both parties are informed. Another way to make unwanted third party decoding more difficult, is to make the Challenge and Response the first character of the strings in the C-R Table. Thus, the length of the message sent can be minimized.

Current data base systems can support millions of entries of Challenge-Response strings. To transfer a large number of messages, millions of entries of Challenge and Response strings need to be shared between the sender and the receiver. Entries for $2^{32}$ account for several million entries and are addressable using 32 bits. Thirty-two bits account for 4 bytes. In one embodiment of the present invention the following are sent:

<Slot id, Challenge substring, Response substring>If the Challenge and Response substrings are of length 1, one byte is required for each. Therefore, the C-R would be:
<4 bytes, 1 byte, 1 byte>

Thus, in this embodiment, the total size of the transferred text is no more than 6 bytes.

The larger each Response substring is, the faster the remaining available Response strings are trimmed, and, therefore, the sooner a new C-R Table is needed. Thus, a smaller Response substring maximizes the availability of a given Response string. When the Response string has all its values trimmed, the slot id cannot be used for a value of 1.

If a one character Challenge and a one character Response is used, the amount of data transferred will be 6×n, where 6 reflects a four byte slot id+a one byte Challenge+a one byte Response, and n is the number of bits to be transferred. Hence, the amount of data transferred may be comparatively less than with other pre-existing methods. For example, the strength of a public key algorithm, such as an RSA algorithm, depends on the fact that the larger the number of factors used, the more difficult it is to break. However, once the factorization has been successfully broken by an unauthorized $3^{rd}$ party, the messages can be intercepted and decoded. With an embodiment of the present invention, anyone trying to intercept the message will be unable to decode the message because only the sender and receiver have the correct C-R Table.

The sender sends both the Challenge and Response. The specific implementation is left to the discretion of the developers of the C-R system, though one possible implementation is shown below.

Sender transfers {c1, c2, c3, c4, c5, c6, c7 . . . } a sequence of Challenges in a go.

Sender also transfers {r1, r2, r3, r4, r5, r6, r7 . . . } which is a sequence of Responses corresponding to each Challenge. This can be implemented as {(c1, r1), (c2, r2), (c3, r3) . . . } or to save time and to decrypt in parallel, the sender need not make pairs for all the bits, he can form C-R pairs for each bit or a set of bits, send, and then do another set.

The same Challenge can have more than one Response. This implementation is also left to vendors' discretion. A chosen implementation may allow sending part of a Response string as a Response. For the same Challenge, different characters of the Response/substrings of the Response can be sent at different intervals of time. Another efficient method of usage would be to send the index of the Challenge string, a substring of Challenge string and a substring of the Response string rather than complete Challenge Response pairs.

Example 2

The Following Challenge/Response Table is Shared Between A and B

TABLE 3

| | (C-R) | |
|---|---|---|
| Slot Number | CHALLENGE | RESPONSE |
| 1 | XYZ | BHJ |
| 2 | MNO | KLR |
| 3 | PQR | YUIO |

A wants to transfer 1100 to B. A sends the following message:
{(1,XY,J), (1,Z,B), (1,XYZ, L), (1, MN, Ro)}

B decodes:
Index=1
Challenge string {XYZ}
Response string {BHJ

T=True and F=False. The parameter is a substring of the Challenge and the Response string in the given index slot.

1. (1, XY, J)=(1, T, T)=>decode as 1
   The first set decodes to 1, as in slot number 1, the correct Challenge can be X, Y, or Z (or any combination of X, Y, or Z) and the correct Response can be B, H, or J (or any combination of B, H, or J). Since the first set contains 2 correct letters (X and Y) from the Challenge column in the first slot row (1), and a correct Response letter from the Response column in the first slot row (1), the decode is true and true.

2. (1, Z, B)=(1, T, T)=>decode as 1
   The second set decodes to 1, as in the slot number 1, the correct Challenge can be X, Y, or Z (or any combination of X, Y, or Z) and the correct Response can be B, H, or J (or any combination of B, H, or J). Since the second set contains correct letters (Z and B) from the Challenge column in the first slot row (1), and a correct Response letter from the Response column in the first slot row (1), the decode is true and true.

3. (1, XYZ, L)=(1, T, F)=>decode as 0
   The third set is T and F, as XYZ are the correct letters under the Challenge column in the first slot row and BHJ are the correct letters under the Response column in the first slot row. Since L is not a correct Response in the first slot row, it is false and the pair decodes as 0.

4. (1, MN, Ro)=(1, F,F)=>decode as 0
   The fourth set is F and F, as XYZ can be correct letters under the Challenge column in the first slot row and BHJ can be correct letters under the Response column in the first slot row. Since MN is not a correct Challenge and Ro is not a correct Response in the first slot row, they are both false and decode as 0.

Example 3

Using the same C-R table as used above, A and B agree to use 'or' as an operator. A wants to transfer 1100 to B. A sends:
{(1, X, N), (1, H, B), (3, O, J), (2, K, U)}
B decodes:
Index=1
Challenge string {XYZ}
Response string {BHJ}
T=True. F=False.
1. (1, X, N) decoded as 1
   In slot 1, Challenge can be X, Y, or Z and X is True. Response can be B, H, or J and N is False. However, the operator makes the pair X 'or' N and since X is True, it decodes as 1.
2. (1, H, B) is decoded as 1
   In slot 1, Challenge can be X, Y, or Z and H is False. Response can be B, H, or J and B is True. Therefore, the operator makes the pair H 'or' B and since B is True, it decodes as 1.
3. (3, O, J) is decoded as 0
   In slot 3, the Challenge can be P, Q, or R and O is False. The Response can be Y, U, I, or O and J is False. The operator makes the pair O 'or' J but since both are False, it decodes as 0.
4. (2, K, U) is decoded as 0
   In slot 2, the Challenge can be M, N, or O and K is False. The Response can be K, L, or R and U is False. The operator makes the pair K 'or' U but since both are False, it decodes as 0.

After the use the C-R table is trimmed. Since the only correct response used in Example 3 was B, it is removed to change Table 3 (C-R) to:

TABLE 3

| (C-R) | | |
|---|---|---|
| Slot Number | CHALLENGE | RESPONSE |
| 1 | XYZ | HJ |
| 2 | MNO | KLR |
| 3 | PQR | YUIO |

The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A computer system for generating a one way transmission and keyless decoding of information, comprising a processor programmed to:
generate keyless coded information at a sender, said keyless coded information comprising an index, a challenge, and a response from a predefined challenge and response table stored in a computer memory at said sender, said keyless coded information comprising a complete self-authenticating message that when received by an authorized receiver does not require a response from said receiver to said sender;
receive said keyless coded information at said authorized receiver, said predefined challenge and response table also stored in a computer memory at said authorized receiver;
compare, at said authorized receiver, said challenge and said response at said index to said stored predefined challenge and response table;
upon a determination that said challenge and said response are correct, determine a first decoded answer; and
upon a determination that either said challenge or said response, or both are incorrect, determine a second decoded answer.

2. The computer system of claim 1, wherein the processor is further programmed to populate said challenge and response table with a first string of challenge characters and a second string of response characters, each corresponding to said index.

3. The computer system of claim 2, wherein said challenge comprises a substring of said first string of characters.

4. The computer system of claim 2, wherein said response comprises a substring of said second string of characters, and wherein said first string of challenge characters can be reused until each of said response substrings have been used.

5. The computer system of claim 2, wherein the processor is further programmed to trim said second string of characters from said table upon use of said characters.

6. The computer system of claim 1, wherein the processor is further programmed to determine said first decoded answer to be a 1 and said second decoded answer to be a 0.

7. A computer program product for generating a one way transmission and keyless decoding of information, comprising:
a non-transitory computer readable storage medium; and
computer readable program code stored on the computer readable storage medium, and when executed by a processor, the computer readable program code causes a computer to:
generate keyless coded information at a sender, said keyless coded information comprising an index, a challenge, and a response from a predefined challenge and response table stored at said sender, said keyless coded information comprising a complete self-authenticating message that when received by an authorized receiver does not require a response from said receiver to said sender;
receive said keyless coded information at said authorized receiver, said stored and predefined challenge and response table also stored at said authorized receiver;
compare, at said authorized receiver, said challenge and said response at said index to said stored predefined challenge and response table;
upon determining that said challenge and said response are correct, determine a first decoded answer; and
upon determining that either said challenge or said response, or both are incorrect, determine a second decoded answer.

8. The computer program product of claim 7, further comprising populating said challenge and response table with a first string of challenge characters and a second string of response characters, each corresponding to said index.

9. The computer program product of claim 8, wherein said challenge comprises a substring of said first string of characters.

10. The computer program product of claim 8, wherein said response comprises a substring of said second string of characters and wherein said first string of challenge characters can be reused until each of said response substrings have been used.

11. The computer program product of claim 7, further comprising determining said first decoded answer to be a 1 and said second decoded answer to be a 0.

* * * * *